(12) United States Patent
Kim et al.

(10) Patent No.: US 11,706,539 B2
(45) Date of Patent: Jul. 18, 2023

(54) IMAGE SENSING DEVICE AND OPERATING METHOD THEREOF

(71) Applicant: SK hynix Inc., Gyeonggi-do (KR)

(72) Inventors: Eun Jun Kim, Gyeonggi-do (KR); Jin Seon Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/077,734

(22) Filed: Oct. 22, 2020

(65) Prior Publication Data

US 2021/0368118 A1    Nov. 25, 2021

(30) Foreign Application Priority Data

May 21, 2020    (KR) .................. 10-2020-0060695

(51) Int. Cl.
*H04N 25/75*    (2023.01)
*G05F 3/26*    (2006.01)
*H04N 25/78*    (2023.01)

(52) U.S. Cl.
CPC ............. *H04N 25/75* (2023.01); *G05F 3/262* (2013.01); *H04N 25/78* (2023.01)

(58) Field of Classification Search
CPC ...... H04N 5/3698; H04N 5/374; H04N 5/378; H04N 25/709; H04N 25/75; H04N 25/76; H04N 25/78; H01L 27/14609; G05F 3/24; G05F 3/262
See application file for complete search history.

(56) References Cited

U.S. PATENT DOCUMENTS 9,160,319 B2    10/2015  Kato et al.
2016/0301883 A1*  10/2016  Kim ..................... H04N 25/75
2017/0237914 A1*  8/2017   Cho ........................ H03K 4/50
                                                           348/241

FOREIGN PATENT DOCUMENTS

KR    10-2017-0094751    8/2017

* cited by examiner

*Primary Examiner* — Lin Ye
*Assistant Examiner* — Chriss S Yoder, III
(74) *Attorney, Agent, or Firm* — IP & T Group LLP

(57) ABSTRACT

An image sensing device and an operating method thereof. The image sensing device includes a ramp signal generation circuit suitable for generating a ramp signal which corresponds to an analog gain, based on a main bias voltage, a cascode bias voltage and a plurality of ramp code signals, a bias voltage generation circuit suitable for generating the main bias voltage and the cascode bias voltage according to the analog gain, and a boost circuit suitable for boosting an output terminal of the cascode bias voltage according to the analog gain.

22 Claims, 16 Drawing Sheets

IMAGE SENSING DEVICE AND OPERATING METHOD THEREOF

CROSS-REFERENCE TO RELATED APPLICATION(S)

This application claims priority under 35 U.S.C. § 119 to Korean Patent Application No. 10-2020-0060695, filed on May 21, 2020, the disclosure of which is incorporated herein by reference in its entirety.

BACKGROUND

1. Field

Various embodiments of the present disclosure relate to a semiconductor design technique and, more particularly, to an image sensing device and an operating method thereof.

2. Description of the Related Art

Image sensing devices capture images using the property of a semiconductor which reacts to light. Image sensing devices may be classified into charge-coupled device (CCD) image sensing devices and complementary metal-oxide semiconductor (CMOS) image sensing devices. Recently, CMOS image sensing devices are widely used because they allow both analog and digital control circuits to be directly implemented on a single integrated circuit (IC).

SUMMARY

Various embodiments of the present disclosure are directed to an image sensing device that stably generates and uses a ramp signal even though an analog gain is changed. Various embodiments of the present disclosure are also directed to an operating method of the image sensing device.

In accordance with an embodiment, an image sensing device is provided. The image sensing device includes a ramp signal generation circuit suitable for generating a ramp signal which corresponds to an analog gain, based on a main bias voltage, a cascode bias voltage and a plurality of ramp code signals. The image sensing device also includes a bias voltage generation circuit suitable for generating the main bias voltage and the cascode bias voltage according to the analog gain, and a boost circuit suitable for boosting an output terminal of the cascode bias voltage according to the analog gain.

The boost circuit may be enabled during an initial period when the analog gain is changed.

The boost circuit may boost the output terminal of the cascode bias voltage by adding a first boost current to the output terminal of the cascode bias voltage.

In accordance with an embodiment, an image sensing device is provided which includes a first stage coupled between a first voltage terminal and a second voltage terminal and is suitable for supplying a main current to an output terminal of a main bias voltage based on a bias voltage corresponding to an analog gain. The image sensing device further includes a second stage coupled between the first voltage terminal and the second voltage terminal and is suitable for supplying a cascode current to an output terminal of a cascode bias voltage based on the bias voltage. The image sensing device also includes a third stage coupled between the first voltage terminal and the second voltage terminal and is suitable for supplying a first boost current to the output terminal of the cascode bias voltage based on the bias voltage and a boost control signal. The image sensing device further includes a ramp signal generation circuit coupled between the first voltage terminal and the second voltage terminal, and is suitable for generating a ramp signal which corresponds to the analog gain, based on the main bias voltage, the cascode bias voltage, and a plurality of ramp code signals.

The boost control signal may be activated during an initial period when the analog gain is changed.

In accordance with an embodiment, an operating method of an image sensing device is provided. The image sensing device generates and uses a ramp signal whose slope is adjusted according to an analog gain. The operating method includes generating the ramp signal having a first slope, based on main and cascode bias voltages corresponding to a first analog gain, then changing the first analog gain to a second analog gain, boosting an output terminal of the cascode bias voltage during an initial period when the second analog gain is changed, and generating the ramp signal having a second slope, based on the main and cascode bias voltages corresponding to the second analog gain.

The output terminal of the cascode bias voltage may be boosted by adding a boost current to the output terminal of the cascode bias voltage.

In accordance with an embodiment, an operating method of an image sensing device is provided. The operating method includes adjusting a ramp signal based on second main and cascode bias voltages, which transition respectively from first main and cascode bias voltages due to change of an analog gain, and generating digital signals based on pixel signals and the adjusted ramp signals, wherein the adjusting includes boosting the first cascode bias voltage during an initial period upon the change to reduce a transition time to the second cascode bias voltage.

The adjusting may further include boosting the first main bias voltage during the initial period to reduce a transition time to the second main bias voltage.

These and other features and advantages of the present invention will become better understood by those with ordinary skill in the art of the present invention from the following detailed description in reference to the accompanying drawings.

DETAILED DESCRIPTION

Various embodiments are described below with reference to the accompanying drawings, in order to describe in detail the present disclosure to those with ordinary skill in the art to which the present disclosure pertains to easily carry out the present disclosed invention.

Throughout the specification, when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification, specify the presence of the stated elements and do not preclude the presence or addition of one or more other elements, unless otherwise described. In the description throughout the specification, some components are described in singular forms, but the present disclosure is not limited thereto, and it will be understood that the components may be formed in plural.

The drawings are schematic illustrations of various embodiments. As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to simplified cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

It should be understood that the drawings are simplified schematic illustrations of the described devices and may not include well known details for avoiding obscuring the features of the invention.

It should also be noted that features present in one embodiment may be used with one or more features of another embodiment without departing from the scope of the invention.

It is further noted, that in the various drawings, like reference numbers designate like elements.

Figure 1:
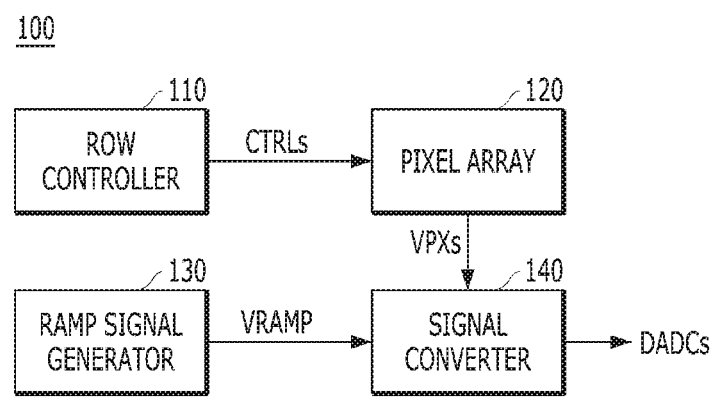
FIG. 1 is a block diagram illustrating an image sensing device in accordance with a first embodiment of the present disclosure.

FIG. 1 is a block diagram illustrating an image sensing device 100 in accordance with a first embodiment of the present disclosure.

Referring to FIG. 1, the image sensing device 100 may include a row controller 110, a pixel array 120, a ramp signal generator 130 and a signal converter 140.

The row controller 110 may generate a plurality of row control signals CTRLs for controlling the pixel array 120 for each row. For example, the row controller 110 may generate first row control signals for controlling pixels arranged in a first row of the pixel array 120, and generate $n^{th}$ row control signals for controlling pixels arranged in an $n^{th}$ row of the pixel array 120, where "n" is a natural number greater than 2.

The pixel array 120 may include a plurality of pixels arranged at intersections of a plurality of rows and a plurality of columns. The plurality of pixels may output a plurality of pixel signals VPXs for each row to the signal converter 140 under the control of the row controller 110.

The ramp signal generator 130 may generate a ramp signal VRAMP. The ramp signal generator 130 may adjust a slope of the ramp signal VRAMP according to an analog gain. For example, the ramp signal generator 130 may generate the ramp signal VRAMP having a first slope according to a low analog gain, and generate the ramp signal VRAMP having a second slope, which is different from the first slope, according to a high analog gain.

The signal converter 140 may generate a plurality of digital signals DADCs based on the plurality of pixel signals VPXs and the ramp signal VRAMP. For example, the signal converter 140 may include an analog to digital converter (ADC).

Figure 2:
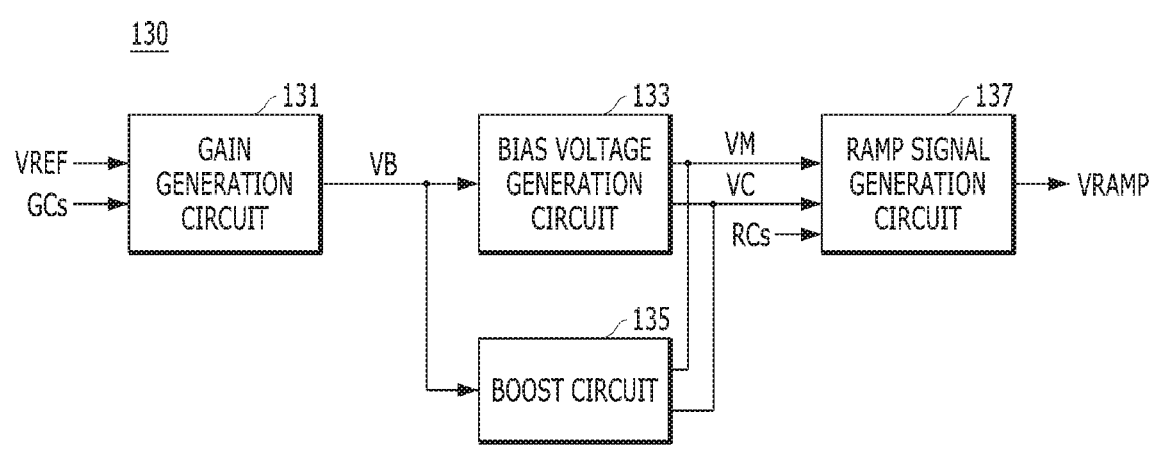
FIG. 2 is a block diagram illustrating an example of a ramp signal generator employed in the image sensing device of FIG. 1.

FIG. 2 is a block diagram illustrating the ramp signal generator 130 illustrated in FIG. 1.

Referring to FIG. 2, the ramp signal generator 130 may include a gain generation circuit 131, a bias voltage generation circuit 133, a boost circuit 135 and a ramp signal generation circuit 137.

The gain generation circuit 131 may generate a bias voltage VB corresponding to the analog gain, based on a reference voltage VREF and gain code signals GCs. The gain code signals GCs may include a plurality of bits indicating the analog gain.

The bias voltage generation circuit 133 may generate a main bias voltage VM and a cascode bias voltage VC based on the bias voltage VB. That is, the bias voltage generation circuit 133 may generate the main bias voltage VM and the cascode bias voltage VC according to the analog gain.

The boost circuit 135 may boost an output terminal of the main bias voltage VM and an output terminal of the cascode bias voltage VC based on the bias voltage VB. That is, the boost circuit 135 may boost the output terminals of the main bias voltage VM and the cascode bias voltage VC according to the analog gain.

The ramp signal generation circuit 137 may generate the ramp signal VRAMP corresponding to the analog gain, based on the main bias voltage VM, the cascode bias voltage VC and ramp code signals RCs.

Figure 3:
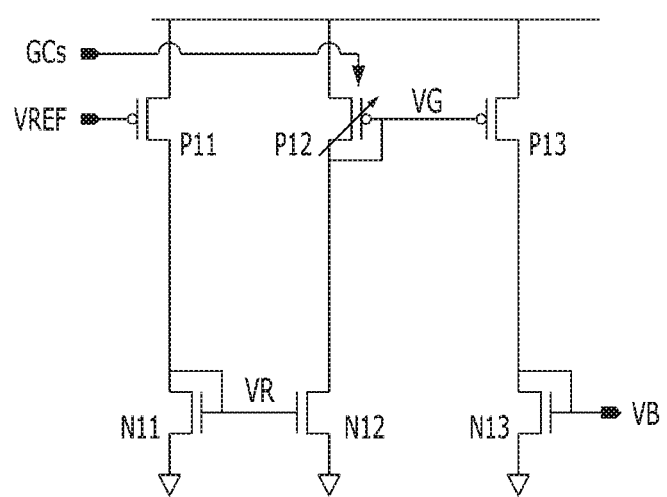
FIG. 3 is a circuit diagram illustrating a gain generation circuit employed in the ramp signal generator of FIG. 2.

FIG. 3 is a circuit diagram illustrating the gain generation circuit 131 employed in the ramp signal generator of FIG. 2.

Referring to FIG. 3, the gain generation circuit 131 may include first to sixth elements P11, N11, N12, P12, P13 and N13.

The first element P11 may be coupled between a high voltage terminal and the second element N11. The first element P11 may generate a reference current corresponding to the reference voltage VREF, based on the reference voltage VREF. For example, the first element P11 may include a PMOS transistor.

The second element N11 may be coupled between the first element P11 and a low voltage terminal. The second element N11 may generate a reference bias voltage VR corresponding to the reference current. For example, the second element N11 may include a diode connected NMOS transistor.

The third element N12 may be coupled between the fourth element P12 and the low voltage terminal. The third element N12 may generate a gain current corresponding to the reference current, based on the reference bias voltage VR. Since the second element N11 and the third element N12 are coupled to each other in a mirroring structure, the gain current may be a current generated by mirroring the reference current. For example, the third element N12 may include an NMOS transistor.

The fourth element P12 may be coupled between the high voltage terminal and the third element N12. The fourth element P12 may adjust the gain current according to the analog gain, based on the gain code signals GCs, and generate a gain bias voltage VG corresponding to the gain current. For example, the fourth element P12 may include a plurality of PMOS transistors. As the plurality of PMOS transistors are selected by the plurality of bits included in the gain code signals GCs, respectively, a size of the fourth element P12 may be adjusted according to the gain code signals GCs. Each of the plurality of PMOS transistors may be a diode connected PMOS transistor.

The fifth element P13 may be coupled between the high voltage terminal and the sixth element N13. The fifth element P13 may generate a bias current corresponding to the gain current, based on the gain bias voltage VG. As the fourth element P12 and the fifth element P13 are coupled to each other in a mirroring structure, the bias current may be a current generated by mirroring the gain current. For example, the fifth element P13 may include a PMOS transistor.

The sixth element N13 may be coupled between the fifth element P13 and the low voltage terminal. The sixth element N13 may generate the bias voltage VB corresponding to the bias current. For example, the sixth element N13 may be a diode connected NMOS transistor.

Figure 4:
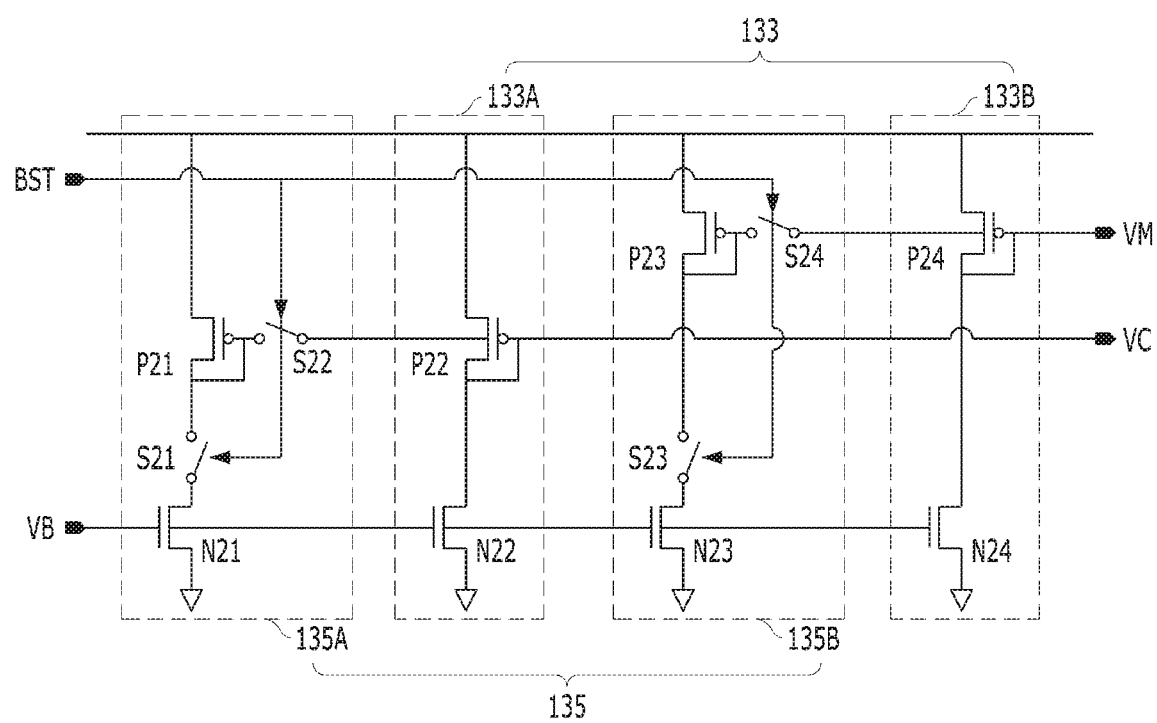
FIG. 4 is a circuit diagram illustrating an example of a bias voltage generation circuit and a boost circuit employed in the ramp signal generator of FIG. 2.

FIG. 4 is a circuit diagram illustrating an example of the bias voltage generation circuit 133 and the boost circuit 135 employed in the ramp signal generator of FIG. 2.

Referring to FIG. 4, the bias voltage generation circuit 133 may include a main stage 133B and a cascade stage 133A.

The main stage 133B may be coupled between the high voltage terminal and the low voltage terminal. The main stage 133B may generate the main bias voltage VM based on the bias voltage VB corresponding to the analog gain. In other words, the main stage 133B may generate a main current at the output terminal of the main bias voltage VM, based on the bias voltage VB.

For example, the main stage 133B may include a first element N24 and a second element P24. The first element N24 may be coupled between the low voltage terminal and the second element P24. The first element N24 may generate the main current based on the bias voltage VB. For example, the first element N24 may include an NMOS transistor. The second element P24 may be coupled between the high voltage terminal and the first element N24. The second element P24 may generate the main bias voltage VM corresponding to the main current. For example, the second element P24 may include a diode connected PMOS transistor.

The cascode stage 133A may be coupled between the high voltage terminal and the low voltage terminal. The cascode stage 133A may generate the cascode bias voltage VC based on the bias voltage VB. In other words, the cascode stage 133A may generate a cascode current at the output terminal of the cascode bias voltage VC.

For example, the cascode stage 133A may include a first element N22 and a second element P22. The first element N22 may be coupled between the low voltage terminal and the second element P22. The first element N22 may generate the cascode current based on the bias voltage VB. For example, the first element N22 may include an NMOS transistor. The second element P22 may be coupled between the high voltage terminal and the first element N22.

The second element P22 may generate the cascode bias voltage VC corresponding to the cascode current. For example, the second element P22 may include a diode connected PMOS transistor.

The boost circuit 135 may include a main boost stage 135B and a cascade boost stage 135A.

The main boost stage 135B may be coupled between the high voltage terminal and the low voltage terminal. The main boost stage 135B may supply a main boost current to the output terminal of the main bias voltage VM, based on the bias voltage VB and a boost control signal BST during an initial period when the analog gain is changed. In other words, the main boost stage 135B may add the main boost current to the output terminal of the main bias voltage VM during the initial period right after the analog gain is changed. Accordingly, the main boost stage 135B may reduce settling time or transition time of the main bias voltage VM during the initial period. The boost control signal BST may be activated during the initial period.

For example, the main boost stage 135B may include a first element N23, a first switch element S23, a second element P23 and a second switch element S24. The first element N23 may be coupled between the low voltage terminal and the first switch element S23 The first element N23 may generate the main boost current based on the bias voltage VB. For example, the first element N23 may include an NMOS transistor. The first switch element S23 may be coupled between the first element N23 and the second element P23. The first switch element S23 may selectively couple the first element N23 to the second element P23, based on the boost control signal BST. For example, the first switch element S23 may electrically couple the first element N23 to the second element P23 during the initial period, and electrically decouple the first element N23 from the second element P23 during the other periods except the initial period. The second element P23 may be coupled between the high voltage terminal and the first switch element S23. The second element P23 may generate the main boost current at the output terminal of the main bias voltage VM. For example, the second element P23 may include a diode connected PMOS transistor. The second switch element S524 may be coupled between a gate terminal of the PMOS transistor included in the second element P23 and the output terminal of the main bias voltage VM. The second switch element S24 may selectively couple the gate terminal of the PMOS transistor included in the second element P23 to the output terminal of the main bias voltage VM, based on the boost control signal BST. For example, the second switch element S24 may electrically couple the gate terminal of the PMOS transistor included in the second element P23 to the output terminal of the main bias voltage VM during the initial period, and electrically decouple the gate terminal of the PMOS transistor included in the second element P23 from the output terminal of the main bias voltage VM during the other periods except the initial period.

The cascode boost stage 135A may be coupled between the high voltage terminal and the low voltage terminal. The cascode boost stage 135A may supply a cascode boost current to the output terminal of the cascode bias voltage VC, based on the bias voltage VB and the boost control signal BST during the initial period. In other words, the cascode boost stage 135A may add the cascode boost current to the output terminal of the cascode bias voltage VC during the initial period. Accordingly, the cascode boost stage 135A may reduce settling time or transition time of the cascode bias voltage VC during the initial period.

For example, the cascode boost stage 135A may include a first element N21, a first switch element S21, a second element P21 and a second switch element S22. The first element N21 may be coupled between the low voltage terminal and the first switch element S21. The first element N21 may generate the cascode boost current based on the bias voltage VB. For example, the first element N21 may include an NMOS transistor. The first switch element S21 may be coupled between the first element N21 and the second element P21. The first switch element S21 may selectively couple the first element N21 to the second element P21 based on the boost control signal BST. For example, the first switch element S21 may electrically couple the first element N21 to the second element P21 during the initial period, and electrically decouple the first element N21 from the second element P21 during the other periods except the initial period. The second element P21 may be coupled between the high voltage terminal and the first switch element S21. The second element P21 may generate the cascode boost current at the output terminal of the cascode bias voltage VC. For example, the second element P21 may include a diode connected PMOS transistor. The second switch element S22 may be coupled between a gate terminal of the PMOS transistor included in the second element P21 and the output terminal of the cascode bias voltage VC. The second switch element S22 may selectively couple the gate terminal of the PMOS transistor included in the second element P21 to the output terminal of the cascode bias voltage VC, based on the boost control signal BST. For example, the second switch element S22 may electrically couple the gate terminal of the PMOS transistor included in the second element P21 to the output terminal of the cascode bias voltage VC during the initial period, and electrically decouple the gate terminal of the PMOS transistor included in the second element P21 from the output terminal of the cascode bias voltage VC during the other periods except the initial period.

Figure 5:
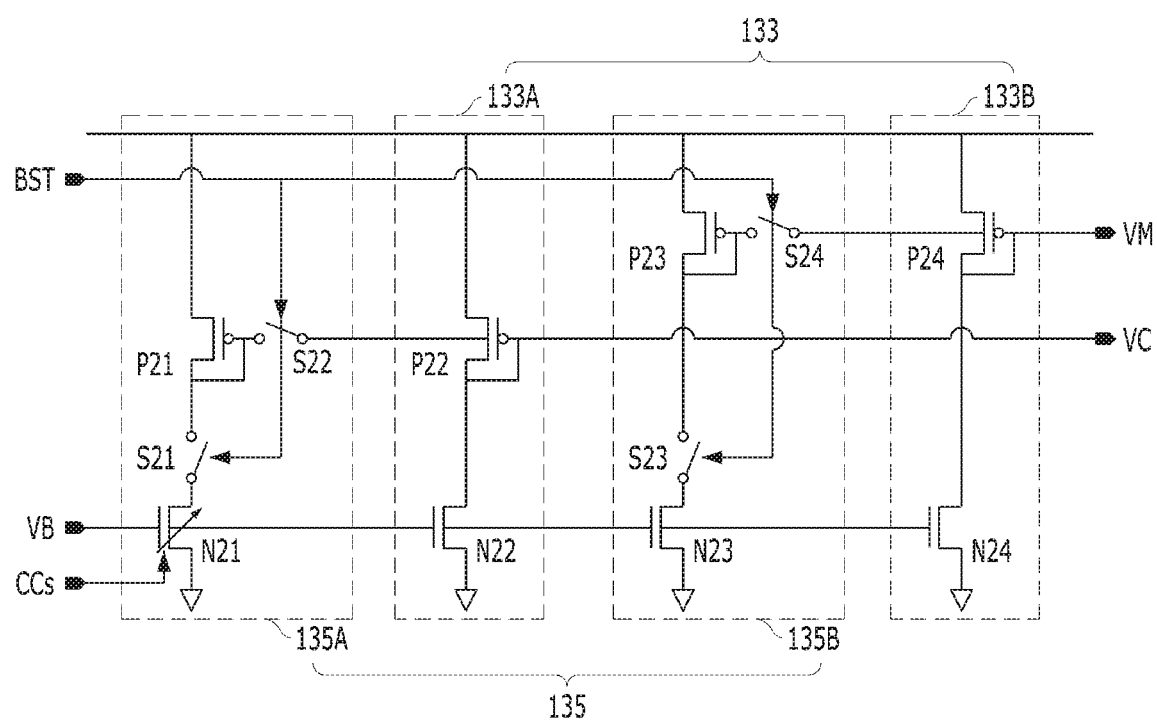
FIG. 5 is a circuit diagram illustrating another example of the bias voltage generation circuit and the boost circuit employed in the ramp signal generator of FIG. 2.
Figure 6:
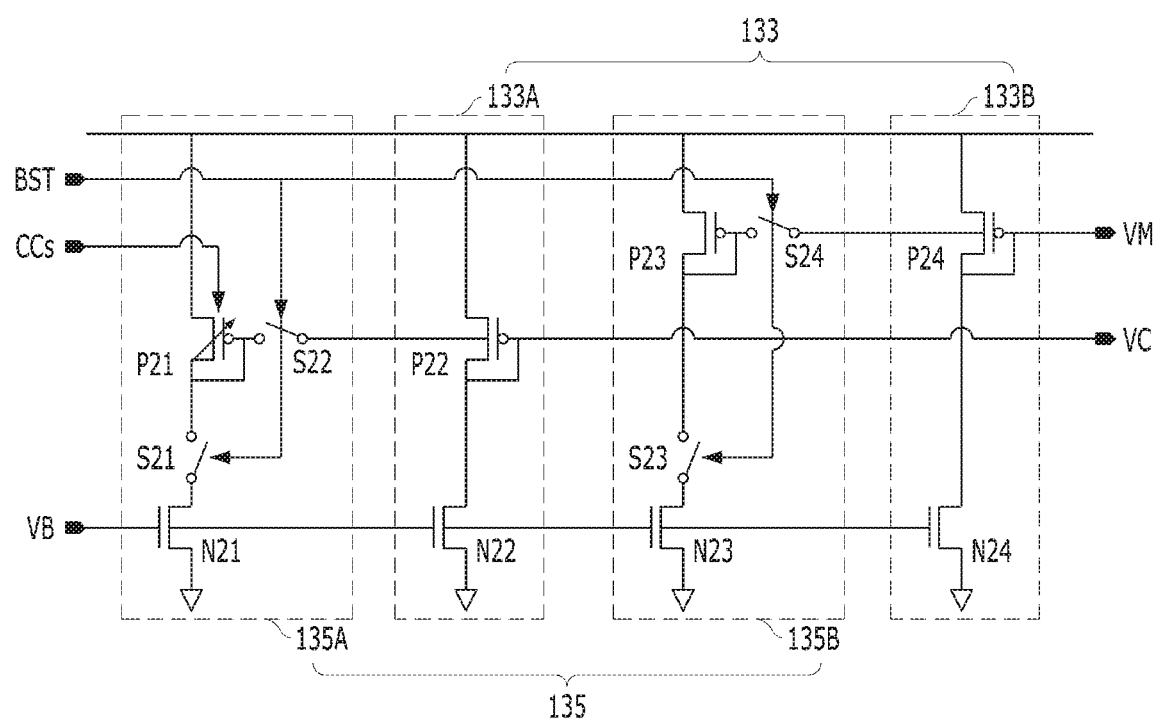
FIG. 6 is a circuit diagram illustrating still another example of the bias voltage generation circuit and the boost circuit employed in the ramp signal generator of FIG. 2.

FIG. 5 is a circuit diagram illustrating another example of the bias voltage generation circuit 133 and the boost circuit 135 employed in the ramp signal generator of FIG. 2. FIG. 6 is a circuit diagram illustrating still another example of the bias voltage generation circuit 133 and the boost circuit 135 employed in the ramp signal generator of FIG. 2.

The example illustrated in FIG. 5 and the example illustrated in FIG. 6 may further have a feature that the cascode boost current may be tuned, as compared to the example illustrated in FIG. 4. The above feature may further reduce the settling time of the cascode bias voltage VC. Hereinafter, only configurations for tuning the cascode boost current will be described.

Referring to FIG. 5, the first element N21 included in the cascode boost stage 135A may adjust the cascode boost current based on control code signals CCs. For example, the first element N21 may include a plurality of NMOS transistors. The plurality of NMOS transistors are selected by a plurality of bits included in the control code signals CCs, respectively, so that a size of the first element N21 may be adjusted according to the control code signals CCs.

Referring to FIG. 6, the second element P21 included in the cascode boost stage 135A may adjust the cascode boost current based on the control code signals CCs. For example, the second element P21 may include a plurality of PMOS transistors. The plurality of PMOS transistors are selected by a plurality of bits included in the control code signals CCs, respectively, so that a size of the second element P21 may be adjusted according to the control code signals CCs. Each of the plurality of PMOS transistors may be a diode connected PMOS transistor.

Although the present embodiment describes an example in which the cascode boost current is tuned, the present disclosure is not necessarily limited thereto, and the main boost current may also be tuned. For example, the main boost stage 135b may be designed in the same manner as the cascode boost stage 135A illustrated in FIG. 5 or FIG. 6. However, the main boost stage 135B may be controlled according to control code signals different from the control code signals CCs.

Figure 7:
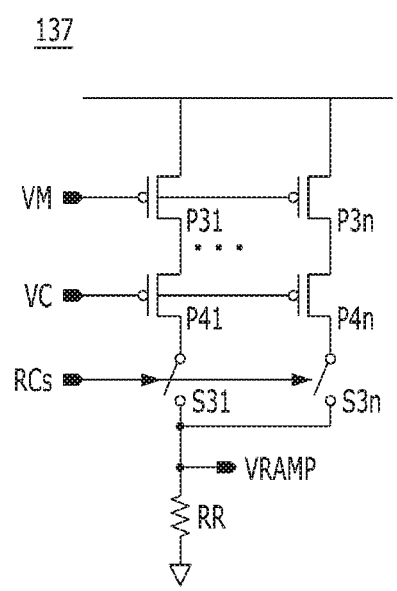
FIG. 7 is a circuit diagram illustrating an example of a ramp signal generation circuit employed in the ramp signal generator of FIG. 2.

FIG. 7 is a circuit diagram illustrating the ramp signal generation circuit 137 employed in the ramp signal generator of FIG. 2.

Referring to FIG. 7, the ramp signal generation circuit 137 may include a plurality of main current cells P31 to P3$n$, a plurality of cascade current cells P41 to P4$n$, a plurality of switch elements S31 to S3$n$ and a current-voltage converter RR.

The plurality of main current cells P31 to P3$n$ may be coupled between the high voltage terminal and the plurality of cascade current cells P41 to P4$n$, respectively. Each of the plurality of main current cells P31 to P3$n$ may generate a unit ramp current based on the main bias voltage VM. For example, each of the plurality of main current cells P31 to P3$n$ may include a PMOS transistor.

The plurality of cascade current cells P41 to P4$n$ may be coupled between the plurality of main current cells P31 to P3$n$ and the plurality of switch elements S31 to S3$n$, respectively. The plurality of cascade current cells P41 to P4$n$ may generate the unit ramp current along with the plurality of main current cells P31 to P3$n$, respectively. For example, each of the plurality of cascade current cells P41 to P4$n$ may include a PMOS transistor.

The plurality of switch elements S31 to S3$n$ may be coupled between the plurality of cascade current cells P41 to P4$n$, respectively, and an output terminal of the ramp signal VRAMP. The plurality of switch elements S31 to S3$n$ may be sequentially controlled based on a plurality of bits included in the ramp code signals RCs, respectively.

The current-voltage converter RR may be coupled between the output terminal of the ramp signal VRAMP and the low voltage terminal. The current-voltage converter RR may convert a summed current of a plurality of unit ramp currents, which are supplied to the output terminal of the ramp signal VRAMP, into the ramp signal VRAMP. For example, the current-voltage converter RR may include a resistor.

Hereinafter, an operation of the image sensing device 100 in accordance with the first embodiment of the present disclosure, which has the above-described configuration, will be described.

When the row controller 110 sequentially generates the row control signals CTRLs allocated for each row of the pixel array 120 for each row time, the pixel array 120 may generate the plurality of pixel signals VPXs for each row based on the row control signals CTRLs.

The ramp signal generator 130 may generate the ramp signal VRAMP that ramps in a predetermined swing range for each row time. The ramp signal generator 130 may adjust the slope of the ramp signal VRAMP according to the analog gain. That is, the ramp signal generator 130 may change the slope of the ramp signal VRAMP when the analog gain is changed.

The signal converter 140 may generate the plurality of digital signals DADCs based on the ramp signal VRAMP and the plurality of pixel signals VPXs.

Figure 8:
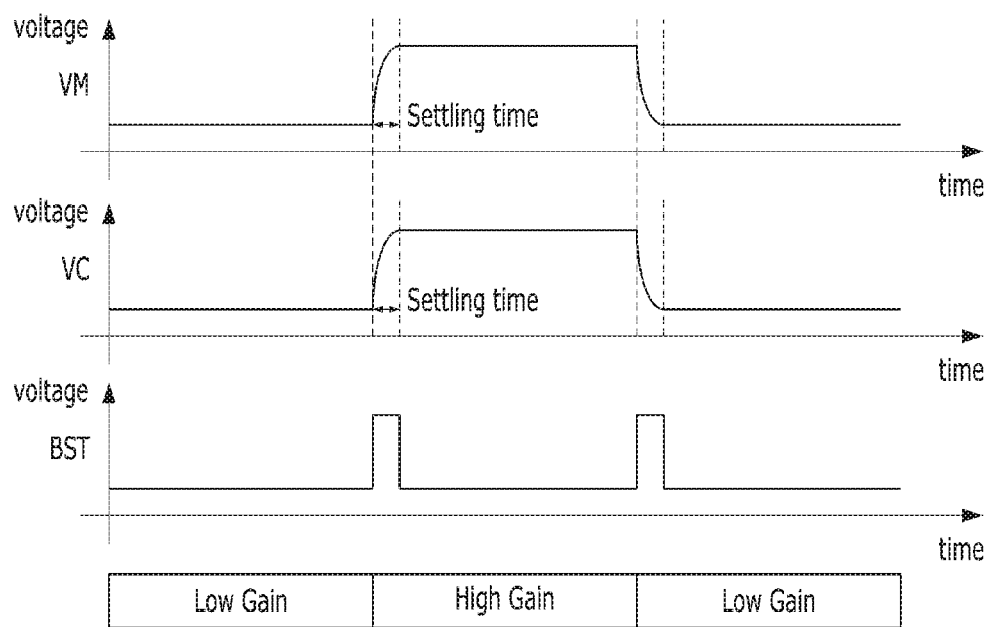
FIG. 8 is a timing diagram illustrating an example of an operation of the ramp signal generator of FIG. 1.

FIG. 8 is a timing diagram illustrating an operation of the ramp signal generator 130 illustrated in FIG. 1.

Referring to FIG. 8, the ramp signal generator 130 may adjust the slope of the ramp signal VRAMP according to the analog gain. Particularly, the ramp signal generator 130 may generate the main bias voltage VM and the cascode bias voltage VC whose voltage levels are adjusted according to the analog gain, and adjust the slope of the ramp signal VRAMP based on the main bias voltage VM and the cascode bias voltage VC. More detailed descriptions thereof are as follows.

The ramp signal generator 130 may generate the main bias voltage VM and cascode bias voltage VC each having a first voltage level according to the low analog gain, and generate the ramp signal VRAMP having the first slope, which corresponds to the low analog gain, based on the main bias voltage VM and cascode bias voltage VC each having the first voltage level.

When the low analog gain is changed to the high analog gain, the ramp signal generator 130 may generate the main bias voltage VM and cascode bias voltage VC each having a second voltage level different from the first voltage level. Particularly, when the low analog gain is changed to the high analog gain, the ramp signal generator 130 may boost the output terminal of the main bias voltage VM and the output terminal of the cascode bias voltage VC during the initial period when the analog gain is changed. In other words, the ramp signal generator 130 may add the main boost current to the output terminal of the main bias voltage VM, and add the cascade boost current to the output terminal of the cascade bias voltage VC. Accordingly, as the output terminal of the main bias voltage VM and the output terminal of the cascade bias voltage VC are boosted during the initial period, the settling time or the transition time of the main bias voltage VM and the settling time of the cascade bias voltage VC may be minimized.

The ramp signal generator 130 may generate the ramp signal VRAMP having the second slope different from the first slope based on the main bias voltage VM and cascade bias voltage VC each having the second voltage level, which corresponds to the high analog gain.

The ramp signal generator 130 may optimize the settling time of the cascode bias voltage VC by tuning, that is, adjusting the cascade boost current based on the control code signals CCs. Alternatively, the ramp signal generator 130 may optimize the settling time of the cascade bias voltage VC and the settling time of the main bias voltage VM by tuning, that is, adjusting the cascade boost current based on the control code signals CCs and tuning, that is, adjusting the main boost current based on the other control code signals.

Since the process of changing the high analog gain to the low analog gain is similar to the above processes, detailed descriptions thereof will be omitted.

According to the first embodiment of the present disclosure, when the analog gain is changed, the settling time of the main bias voltage and the settling time of the cascode bias voltage may be reduced.

Figure 9:
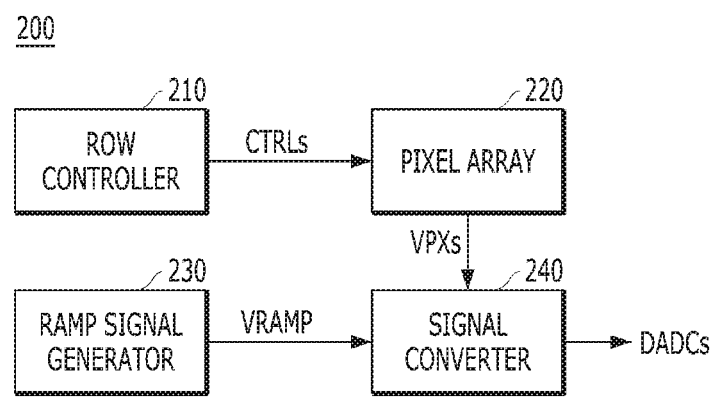
FIG. 9 is a block diagram illustrating an image sensing device in accordance with a second embodiment of the present disclosure.

FIG. 9 is a block diagram illustrating an image sensing device 200 in accordance with a second embodiment of the present disclosure.

Referring to FIG. 9, the image sensing device 200 may include a row controller 210, a pixel array 220, a ramp signal generator 230 and a signal converter 240.

The row controller 210 may generate a plurality of row control signals CTRLs for controlling the pixel array 220 for each row. For example, the row controller 210 may generate first row control signals for controlling pixels arranged in a first row of the pixel array 220, and generate $n^{th}$ row control signals for controlling pixels arranged in an $n^{th}$ row of the pixel array 220, where "n" is a natural number greater than 2.

The pixel array 220 may include a plurality of pixels arranged at intersections of a plurality of rows and a plurality of columns. The plurality of pixels may output a plurality of pixel signals VPXs for each row to the signal converter 240 under the control of the row controller 210.

The ramp signal generator 230 may generate a ramp signal VRAMP. The ramp signal generator 230 may adjust a slope of the ramp signal VRAMP according to an analog gain. For example, the ramp signal generator 230 may generate the ramp signal VRAMP having a first slope according to a low analog gain, and generate the ramp signal VRAMP having a second slope, which is different from the first slope, according to a high analog gain.

The signal converter 240 may generate a plurality of digital signals DADCs based on the plurality of pixel signals VPXs and the ramp signal VRAMP. For example, the signal converter 240 may include an analog to digital converter (ADC).

Figure 10:
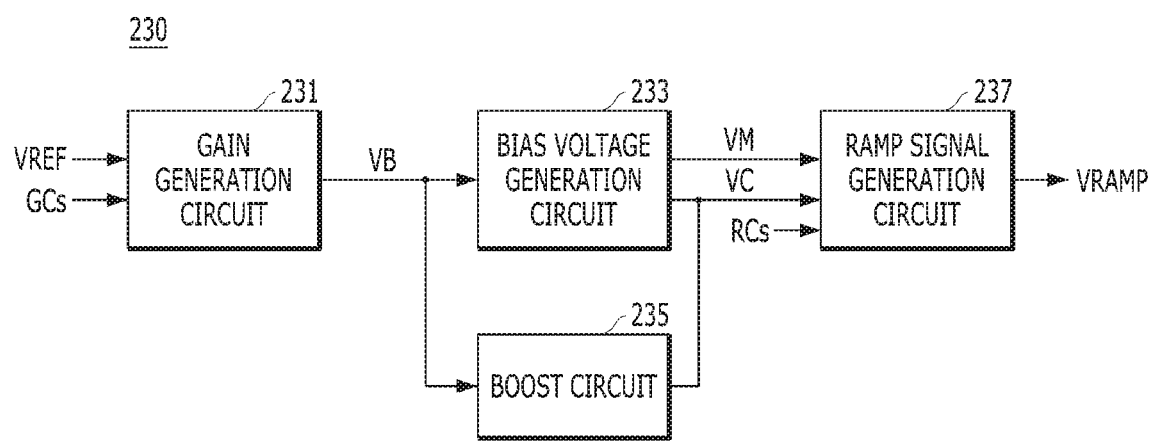
FIG. 10 is a block diagram illustrating a ramp signal generator employed in the image sensing device of FIG. 9.

FIG. 10 is a block diagram illustrating the ramp signal generator 230 illustrated in FIG. 9.

Referring to FIG. 10, the ramp signal generator 230 may include a gain generation circuit 231, a bias voltage generation circuit 233, a boost circuit 235 and a ramp signal generation circuit 237.

The gain generation circuit 231 may generate a bias voltage VB corresponding to the analog gain, based on a reference voltage VREF and gain code signals GCs. The gain code signals GCs may include a plurality of bits indicating the analog gain.

The bias voltage generation circuit 233 may generate a main bias voltage VM and a cascode bias voltage VC based on the bias voltage VB. That is, the bias voltage generation circuit 233 may generate the main bias voltage VM and the cascode bias voltage VC according to the analog gain.

The boost circuit 235 may boost an output terminal of the cascode bias voltage VC based on the bias voltage VB. That is, the boost circuit 235 may boost the output terminal of the cascode bias voltage VC according to the analog gain.

Figure 11:
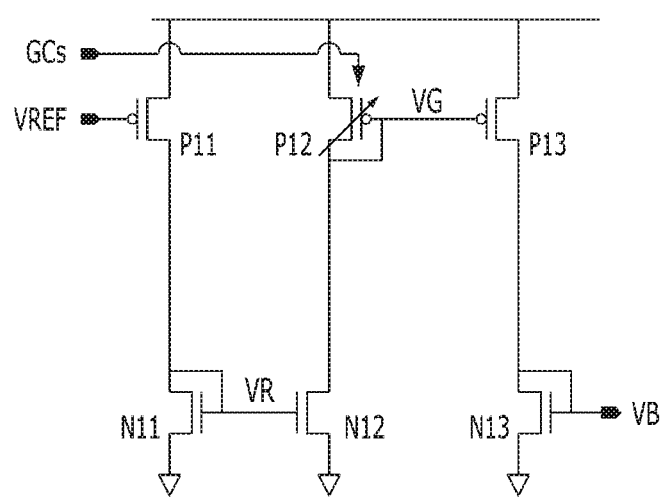
FIG. 11 is a circuit diagram illustrating a gain generation circuit employed in the ramp signal generator of FIG. 10.

The ramp signal generation circuit 237 may generate the ramp signal VRAMP corresponding to the analog gain, based on the main bias voltage VM, the cascode bias voltage VC and ramp code signals RCs, FIG. 11 is a circuit diagram illustrating the gain generation circuit 231 employed in the ramp signal generator of FIG. 10.

Referring to FIG. 11, the gain generation circuit 231 may include first to sixth elements P11, N11, N12, P12, P13 and N13.

The first element P11 may be coupled between a high voltage terminal and the second element N11. The first element P11 may generate a reference current corresponding to the reference voltage VREF, based on the reference voltage VREF. For example, the first element P11 may include a PMOS transistor.

The second element N11 may be coupled between the first element P11 and a low voltage terminal. The second element N11 may generate a reference bias voltage VR corresponding to the reference current. For example, the second element N11 may include a diode connected NMOS transistor.

The third element N12 may be coupled between the fourth element P12 and the low voltage terminal. The third element N12 may generate a gain current corresponding to the reference current, based on the reference bias voltage VR. As the second element N11 and the third element N12 are coupled to each other in a mirroring structure, the gain current may be a current generated by mirroring the reference current. For example, the third element N12 may include an NMOS transistor.

The fourth element P12 may be coupled between the high voltage terminal and the third element N12. The fourth element P12 may adjust the gain current according to the analog gain, based on the gain code signals GCs, and generate a gain bias voltage VG corresponding to the gain current. For example, the fourth element P12 may include a plurality of PMOS transistors. As the plurality of PMOS transistors are selected by the plurality of bits included in the gain code signals GCs, respectively, a size of the fourth element P12 may be adjusted according to the gain code signals GCs. Each of the plurality of PMOS transistors may be a diode connected PMOS transistor.

The fifth element P13 may be coupled between the high voltage terminal and the sixth element N13. The fifth element P13 may generate a bias current corresponding to the gain current, based on the gain bias voltage VG. As the fourth element P12 and the fifth element P13 are coupled to each other in a mirroring structure, the bias current may be a current generated by mirroring the gain current. For example, the fifth element P13 may include a PMOS transistor.

The sixth element N13 may be coupled between the fifth element P13 and the low voltage terminal. The sixth element N13 may generate the bias voltage VB corresponding to the bias current. For example, the sixth element N13 may be a diode connected NMOS transistor.

Figure 12:
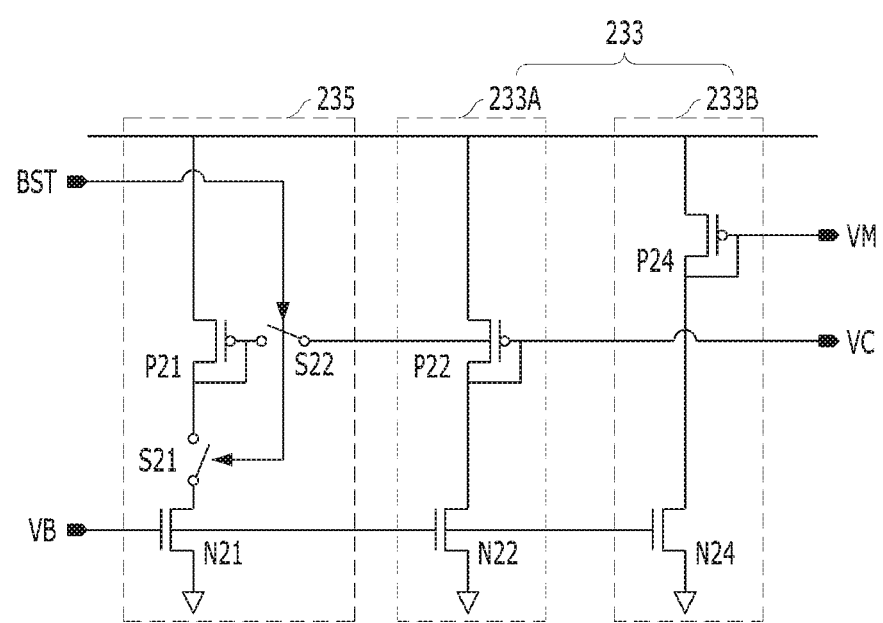
FIG. 12 is a circuit diagram illustrating an example of a bias voltage generation circuit and a boost circuit employed in the ramp signal generator of FIG. 10.

FIG. 12 is a circuit diagram illustrating an example of the bias voltage generation circuit 233 and the boost circuit 235 employed in the ramp signal generator of FIG. 10.

Referring to FIG. 12, the bias voltage generation circuit 233 may include a main stage 233B and a cascode stage 233A.

The main stage 233B may be coupled between the high voltage terminal and the low voltage terminal. The main stage 233B may generate the main bias voltage VM based on the bias voltage VB corresponding to the analog gain. In other words, the main stage 233B may generate a main current at the output terminal of the main bias voltage VM, based on the bias voltage VB.

For example, the main stage 233B may include a first element N24 and a second element P24. The first element N24 may be coupled between the low voltage terminal and the second element P24. The first element N24 may generate the main current based on the bias voltage VB. For example, the first element N24 may include an NMOS transistor. The second element P24 may be coupled between the high voltage terminal and the first element N24. The second element P24 may generate the main bias voltage VM corresponding to the main current. For example, the second element P24 may include a diode connected PMOS transistor.

The cascade stage 233A may be coupled between the high voltage terminal and the low voltage terminal. The cascade stage 233A may generate the cascade bias voltage VC based on the bias voltage VB. In other words, the cascade stage 233A may generate a cascade current at the output terminal of the cascade bias voltage VC.

For example, the cascade stage 233A may include a first element N22 and a second element P22. The first element N22 may be coupled between the low voltage terminal and the second element P22. The first element N22 may generate the cascade current based on the bias voltage VB. For example, the first element N22 may include an NMOS transistor. The second element P22 may be coupled between the high voltage terminal and the first element N22. The second element P22 may generate the cascade bias voltage VC corresponding to the cascode current. For example, the second element P22 may include a diode connected PMOS transistor.

The boost circuit 235 may include a cascade boost stage for boosting the output terminal of the cascode bias voltage VC.

Hereinafter, the boost circuit 235 is referred to as the "cascade boost stage".

The cascode boost stage 235 may be coupled between the high voltage terminal and the low voltage terminal. The cascade boost stage 235 may supply a cascade boost current to the output terminal of the cascode bias voltage VC based on the bias voltage VB and a boost control signal BST. In other words, the cascade boost stage 235 may add the cascode boost current to the output terminal of the cascode bias voltage VC during an initial period. Accordingly, the cascade boost stage 235 may reduce settling time or transition time of the cascode bias voltage VC during the initial period.

For example, the cascade boost stage 235 may include a first element N21, a first switch element S21, a second element P21 and a second switch element S22. The first element N21 may be coupled between the low voltage terminal and the first switch element S21. The first element N21 may generate the cascade boost current based on the bias voltage VB. For example, the first element N21 may include an NMOS transistor. The first switch element S21 may be coupled between the first element N21 and the second element P21. The first switch element S21 may selectively couple the first element N21 to the second element P21 based on the boost control signal BST. For example, the first switch element S21 may electrically couple the first element N21 to the second element P21 during the initial period, and electrically decouple the first element N21 from the second element P21 during the other periods except the initial period. The second element P21 may be coupled between the high voltage terminal and the first switch element S21. The second element P21 may generate the cascade boost current at the output terminal of the cascade bias voltage VC. For example, the second element P21 may include a diode connected PMOS transistor. The second switch element S22 may be coupled between a gate terminal of the PMOS transistor included in the second element P21 and the output terminal of the cascode bias voltage VC. The second switch element S22 may selectively couple the gate terminal of the PMOS transistor included in the second element P21 to the output terminal of the cascode bias voltage VC, based on the boost control signal BST. For example, the second switch element S22 may electrically couple the gate terminal of the PMOS transistor included in the second element P21 to the output terminal of the cascode bias voltage VC during the initial period, and electrically decouple the gate terminal of the PMOS transistor included in the second element P21 from the output terminal of the cascode bias voltage VC during the other periods except the initial period.

Figure 13:
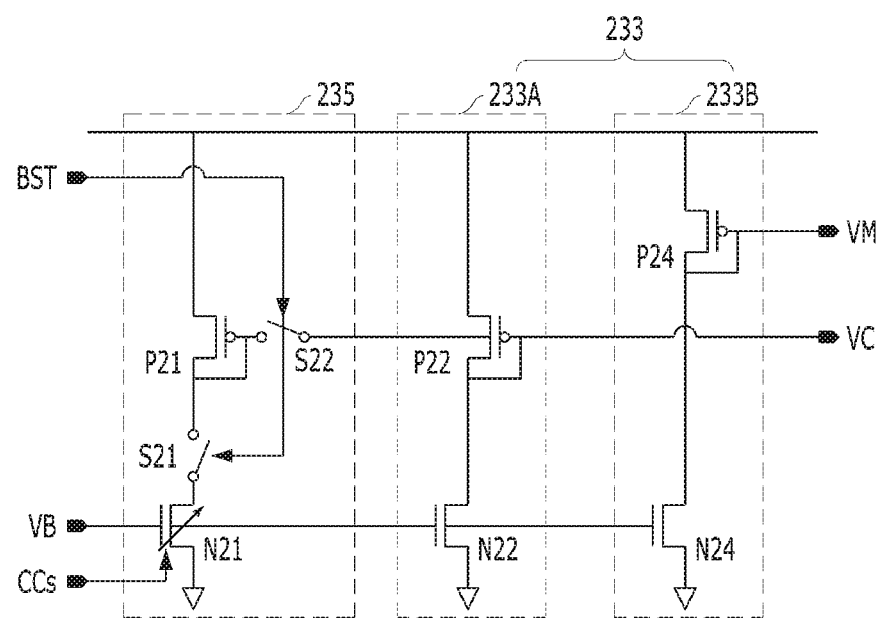
FIG. 13 is a circuit diagram illustrating another example of the bias voltage generation circuit and the boost circuit employed in the ramp signal generator of FIG. 10.
Figure 14:
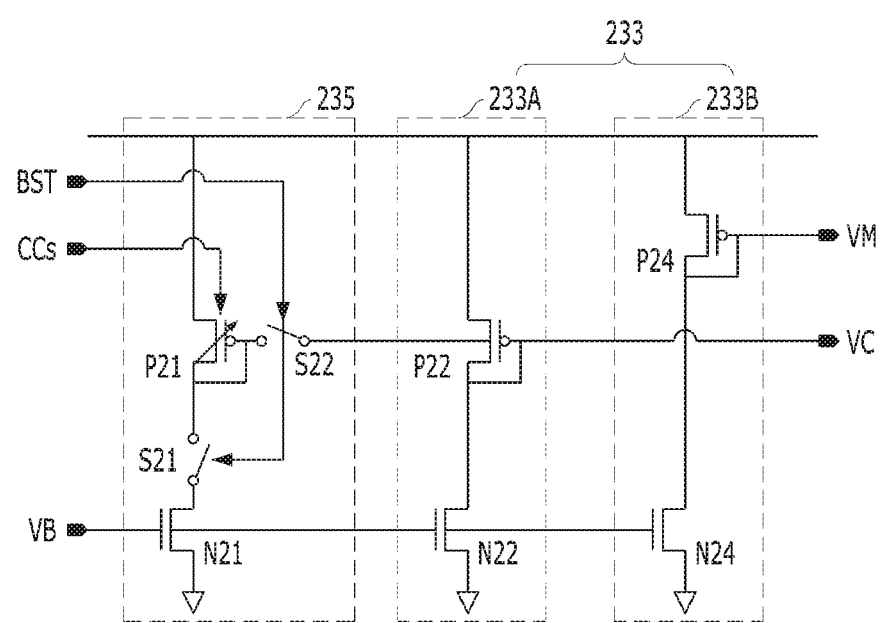
FIG. 14 is a circuit diagram illustrating still another example of the bias voltage generation circuit and the boost circuit employed in the ramp signal generator of FIG. 10.

FIG. 13 is a circuit diagram illustrating another example of the bias voltage generation circuit 233 and the boost circuit 235 employed in the ramp signal generator of FIG. 10. FIG. 14 is a circuit diagram illustrating still another example of the bias voltage generation circuit 233 and the boost circuit 235 employed in the ramp signal generator of FIG. 10.

The example illustrated in FIG. 13 and the example illustrated in FIG. 14 may further have a feature that the cascode boost current may be tuned, as compared to the example illustrated in FIG. 12. The above feature may further reduce the settling time of the cascode bias voltage VC. Hereinafter, only configurations for tuning the cascode boost current will be described.

Referring to FIG. 13, the first element N21 included in the cascode boost stage 235 may adjust the cascode boost current based on the control code signals CCs. For example, the first element N21 may include a plurality of NMOS transistors. The plurality of NMOS transistors are selected by a plurality of bits included in the control code signals CCs, respectively, so that a size of the first element N21 may be adjusted according to the control code signals CCs.

Referring to FIG. 14, the second element P21 included in the cascode boost stage 235 may adjust the cascode boost current based on the control code signals CCs. For example, the second element P21 may include a plurality of PMOS transistors. The plurality of PMOS transistors are selected by a plurality of bits included in the control code signals CCs, respectively, so that a size of the second element P21 may be adjusted according to the control code signals CCs. Each of the plurality of PMOS transistors may be a diode connected PMOS transistor.

Figure 15:
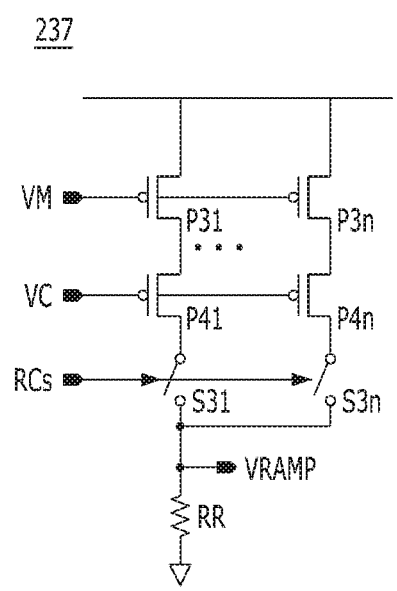
FIG. 15 is a circuit diagram illustrating a ramp signal generation circuit employed in the ramp signal generator of FIG. 10.

FIG. 15 is a circuit diagram illustrating the ramp signal generation circuit 237 employed in the ramp signal generator of FIG. 10.

Referring to FIG. 15, the ramp signal generation circuit 237 may include a plurality of main current cells P31 to P3n, a plurality of cascode current cells P41 to P4n, a plurality of switch elements S31 to S3n and a current-voltage converter RR.

The plurality of main current cells P31 to P3n may be coupled between the high voltage terminal and the plurality of cascode current cells P41 to P4n, respectively. Each of the plurality of main current cells P31 to P3n may generate a unit ramp current based on the main bias voltage VM. For example, each of the plurality of main current cells P31 to P3n may include a PMOS transistor.

The plurality of cascode current cells P41 to P4n may be coupled between the plurality of main current cells P31 to P3n and the plurality of switch elements S31 to S3n, respectively. The plurality of cascode current cells P41 to P4n may generate the unit ramp current along with the plurality of main current cells P31 to P3n, respectively. For example, each of the plurality of cascode current cells P41 to P4n may include a PMOS transistor.

The plurality of switch elements S31 to S3n may be coupled between the plurality of cascode current cells P41 to P4n, respectively, and an output terminal of the ramp signal VRAMP. The plurality of switch elements S31 to S3n may be sequentially controlled based on a plurality of bits included in the ramp code signals RCs, respectively.

The current-voltage converter RR may be coupled between the output terminal of the ramp signal VRAMP and the low voltage terminal. The current-voltage converter RR may convert a summed current of a plurality of unit ramp currents, which are supplied to the output terminal of the ramp signal VRAMP, into the ramp signal VRAMP. For example, the current-voltage converter RR may include a resistor.

Hereinafter, an operation of the image sensing device 200 in accordance with the second embodiment of the present disclosure, which has the above-described configuration, will be described.

When the row controller 210 sequentially generates the row control signals CTRLs allocated for each row of the pixel array 220 for each row time, the pixel array 220 may generate the plurality of pixel signals VPXs for each row based on the row control signals CTRLs.

The ramp signal generator 230 may generate the ramp signal VRAMP that ramps in a predetermined swing range for each row time. The ramp signal generator 230 may adjust the slope of the ramp signal VRAMP according to the analog gain. That is, the ramp signal generator 230 may change the slope of the ramp signal VRAMP when the analog gain is changed.

The signal converter 240 may generate the plurality of digital signals DADCs based on the ramp signal VRAMP and the plurality of pixel signals VPXs.

Figure 16:
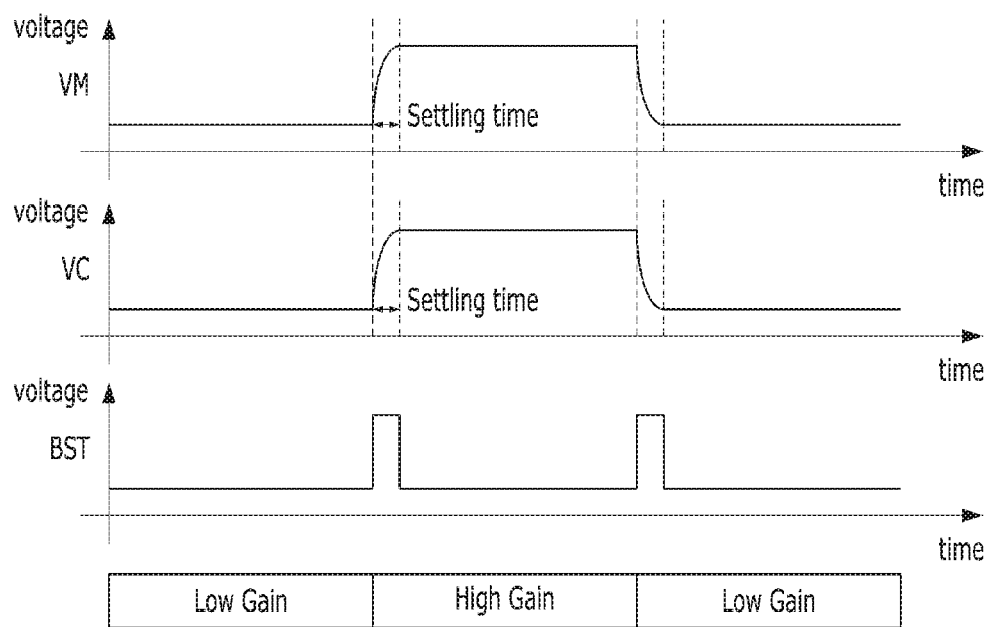
FIG. 16 is a timing diagram illustrating an operation of the ramp signal generator illustrated in FIG. 9.

FIG. 16 is a timing diagram illustrating an operation of the ramp signal generator 230 illustrated in FIG. 9.

Referring to FIG. 16, the ramp signal generator 230 may adjust the slope of the ramp signal VRAMP according to the analog gain. Particularly, the ramp signal generator 230 may generate the main bias voltage VM and the cascode bias voltage VC whose voltage levels are adjusted according to the analog gain, and adjust the slope of the ramp signal VRAMP based on the main bias voltage VM and the cascode bias voltage VC. More detailed descriptions thereof are as follows.

The ramp signal generator 230 may generate the main bias voltage VM and cascode bias voltage VC each having a first voltage level according to the low analog gain, and generate the ramp signal VRAMP having the first slope, which corresponds to the low analog gain, based on the main bias voltage VM and cascode bias voltage VC each having the first voltage level.

When the low analog gain is changed to the high analog gain, the ramp signal generator 230 may generate the main bias voltage VM and cascode bias voltage VC each having a second voltage level different from the first voltage level. Particularly, when the low analog gain is changed to the high analog gain, the ramp signal generator 230 may boost the output terminal of the cascode bias voltage VC during the initial period when the analog gain is changed. In other words, the ramp signal generator 230 may add the cascode boost current to the output terminal of the cascode bias voltage VC. Accordingly, as the output terminal of the cascode bias voltage VC is boosted during the initial period, the settling time or the transition time of the cascode bias voltage VC may be minimized.

The ramp signal generator 230 may optimize the settling time of the cascode bias voltage VC by tuning, that is, adjusting the cascode boost current based on the control code signals CCs.

Since the process of changing the high analog gain to the low analog gain is similar to the above processes, detailed descriptions thereof will be omitted.

According to the second embodiment of the present disclosure, when the analog gain is changed, the settling time of the cascode bias voltage may be reduced.

According to embodiments of the present disclosure, operational reliability of an image sensing device may be improved by stably generating and using a ramp signal even though an analog gain is changed.

While the present invention has been specifically described with reference to the embodiments, it should be noted that the disclosed embodiments are provided for illustrative purposes, not restrictive purposes. Further, those skilled in the art will understand that various embodiments are possible through various substitutions, changes, and modifications within the scope of the present invention.

Example embodiments have been disclosed herein, and although specific terms are employed, the terms are used and are to be interpreted in a generic and descriptive sense only, and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An image sensing device comprising:
    a ramp signal generation circuit suitable for generating a ramp signal which corresponds to an analog gain, based on a main bias voltage, a cascode bias voltage and a plurality of ramp code signals;
    a bias voltage generation circuit suitable for generating the main bias voltage and the cascode bias voltage according to the analog gain; and
    a boost circuit suitable for boosting an output terminal of the cascode bias voltage according to the analog gain.

2. The image sensing device of claim 1, wherein the boost circuit is enabled during an initial period when the analog gain is changed.

3. The image sensing device of claim 1, wherein the boost circuit boosts the output terminal of the cascode bias voltage by adding a first boost current to the output terminal of the cascode bias voltage.

4. The image sensing device of claim 1, wherein the boost circuit includes:
    a first circuit coupled between a first voltage terminal and a first coupling node, and suitable for generating a first boost current based on a bias voltage corresponding to the analog gain;
    a first switch circuit coupled between the first coupling node and a second coupling node, and suitable for selectively coupling the first coupling node to the second coupling node based on a boost control signal which is activated during an initial period when the analog gain is changed;
    a second circuit coupled between the second coupling node and a second voltage terminal, and suitable for supplying the first boost current to a supply node; and
    a second switch circuit coupled between the supply node and the output terminal of the cascode bias voltage, and suitable for selectively coupling the supply node to the output terminal of the cascode bias voltage based on the boost control signal.

5. The image sensing device of claim 4, wherein the first circuit adjusts the first boost current based on a plurality of control code signals.

6. The image sensing device of claim 4, wherein the second circuit adjusts the first boost current based on a plurality of control code signals.

7. The image sensing device of claim 1, wherein the boost circuit boosts an output terminal of the main bias voltage according to the analog gain.

8. The image sensing device of claim 7, wherein the boost circuit is enabled during an initial period when the analog gain is changed.

9. The image sensing device of claim 7, wherein the boost circuit boosts the output terminal of the main bias voltage by adding a second boost current to the output terminal of the main bias voltage.

10. The image sensing device of claim 7, wherein the boost circuit includes:
    a third circuit coupled between a first voltage terminal and a third coupling node, and suitable for generating a second boost current based on a bias voltage corresponding to the analog gain;
    a third switch circuit coupled between the third coupling node and a fourth coupling node, and suitable for selectively coupling the third coupling node to the fourth coupling node based on a boost control signal which is activated during an initial period when the analog gain is changed;
    a fourth circuit coupled between the fourth coupling node and a second voltage terminal, and suitable for supplying the second boost current to a supply node; and
    a fourth switch circuit coupled between the supply node and the output terminal of the main bias voltage, and suitable for selectively coupling the supply node to the output terminal of the main bias voltage based on the boost control signal.

11. An image sensing device comprising:
    a first stage circuit coupled between a first voltage terminal and a second voltage terminal, and suitable for supplying a main current to an output terminal of a main bias voltage based on a bias voltage corresponding to an analog gain;
    a second stage circuit coupled between the first voltage terminal and the second voltage terminal, and suitable for supplying a cascode current to an output terminal of a cascode bias voltage based on the bias voltage;
    a third stage circuit coupled between the first voltage terminal and the second voltage terminal, and suitable for supplying a first boost current to the output terminal of the cascode bias voltage based on the bias voltage and a boost control signal; and
    a ramp signal generation circuit coupled between the first voltage terminal and the second voltage terminal, and suitable for generating a ramp signal, which corresponds to the analog gain, based on the main bias voltage, the cascode bias voltage, and a plurality of ramp code signals.

12. The image sensing device of claim 11, wherein the boost control signal is activated during an initial period when the analog gain is changed.

13. The image sensing device of claim 11, wherein the third stage circuit includes:
- a first circuit coupled between the first voltage terminal and a first coupling node, and suitable for generating the first boost current based on the bias voltage;
- a first switch circuit coupled between the first coupling node and a second coupling node, and suitable for selectively coupling the first coupling node to the second coupling node based on the boost control signal which is activated during an initial period when the analog gain is changed;
- a second circuit coupled between the second coupling node and the second voltage terminal, and suitable for supplying the first boost current to a supply node; and
- a second switch circuit coupled between the supply node and the output terminal of the cascode bias voltage, and suitable for selectively coupling the supply node to the output terminal of the cascode bias voltage based on the boost control signal.

14. The image sensing device of claim 13, wherein the first circuit adjusts the first boost current based on a plurality of control code signals.

15. The image sensing device of claim 13, wherein the second circuit adjusts the first boost current based on a plurality of control code signals.

16. The image sensing device of claim 11, further comprising a fourth stage circuit coupled between the first voltage terminal and the second voltage terminal, and suitable for supplying a second boost current to the output terminal of the main bias voltage based on the bias voltage and the boost control signal.

17. The image sensing device of claim 16, wherein the fourth stage circuit includes:
- a third circuit coupled between the first voltage terminal and a third coupling node, and suitable for generating the second boost current based on the bias voltage;
- a third switch circuit coupled between the third coupling node and a fourth coupling node, and suitable for selectively coupling the third coupling node to the fourth coupling node based on the boost control signal which is activated during an initial period when the analog gain is changed;
- a fourth circuit coupled between the fourth coupling node and the second voltage terminal, and suitable for supplying the second boost current to a supply node; and
- a fourth switch circuit coupled between the supply node and the output terminal of the main bias voltage, and suitable for selectively coupling the supply node to the output terminal of the main bias voltage based on the boost control signal.

18. An operating method of an image sensing device that generates and uses a ramp signal whose slope is adjusted according to an analog gain, the operating method comprising:
- generating the ramp signal having a first slope based on main and cascode bias voltages corresponding to a first analog gain;
- changing the first analog gain to a second analog gain;
- boosting an output terminal of the cascode bias voltage during an initial period when the second analog gain is changed; and
- generating the ramp signal having a second slope, based on the main and cascode bias voltages corresponding to the second analog gain.

19. The operating method of claim 18, wherein the output terminal of the cascode bias voltage is boosted by adding a boost current to the output terminal of the cascode bias voltage.

20. The operating method of claim 18, wherein the boosting of the output terminal of the cascode bias voltage includes:
- adjusting a boost current based on a plurality of control code signals during the initial period; and
- adding the boost current to the output terminal of the cascode bias voltage.

21. The operating method of claim 18, further comprising, before the generating of the ramp signal having the second slope, boosting an output terminal of the main bias voltage during the initial period.

22. The operating method of claim 21, wherein the output terminal of the main bias voltage is boosted by adding a boost current to the output terminal of the main bias voltage.

* * * * *